(12) United States Patent
Krebs et al.

(10) Patent No.: US 9,344,531 B2
(45) Date of Patent: May 17, 2016

(54) CONVERSION DEVICE AND COMMUNICATION NETWORK HAVING A CONVERSION DEVICE

(71) Applicant: Bayerische Motoren Werke Aktiengesellschaft, Munich (DE)

(72) Inventors: Benjamin Krebs, Zorneding (DE); Thomas Koenigseder, Wilfling (DE); Albrecht Neff, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 33 days.

(21) Appl. No.: 14/310,609

(22) Filed: Jun. 20, 2014

(65) Prior Publication Data

US 2014/0301408 A1     Oct. 9, 2014

Related U.S. Application Data

(63) Continuation of application No. PCT/EP2012/075899, filed on Dec. 18, 2012.

(30) Foreign Application Priority Data

Dec. 21, 2011  (DE) .......................... 10 2011 089 420

(51) Int. Cl.
*H04L 29/06* (2006.01)
*H04L 12/64* (2006.01)

(52) U.S. Cl.
CPC ............ *H04L 69/08* (2013.01); *H04L 12/6418* (2013.01)

(58) Field of Classification Search
CPC ....................................................... H04L 69/08

USPC .................................................. 370/466, 467
See application file for complete search history.

(56) References Cited

U.S. PATENT DOCUMENTS

| 5,511,072 A * | 4/1996 | Delprat | ................ H04W 88/08 370/336 |
| 6,654,355 B1 | 11/2003 | Marbach et al. | |

(Continued)

FOREIGN PATENT DOCUMENTS

| DE | 600 26 734 T2 | 9/2006 |
| DE | 10 2007 001 137 A1 | 8/2007 |

(Continued)

OTHER PUBLICATIONS

International Preliminary Report on Patentability (PCT/IB/373), including English Translation of Written Opinion (PCT/ISA/237) dated Jun. 24, 2014 (seven (7) pages).

(Continued)

*Primary Examiner* — Rasheed Gidado
(74) *Attorney, Agent, or Firm* — Crowell & Moring LLP

(57) ABSTRACT

A conversion device is designed for converting message units of a first communications protocol, which are received by the conversion device on the input side, to container messages of a second communications protocol. A predefined maximal dwell duration in the conversion device is assigned to each message unit. The conversion device is designed for assigning message units with an identical recipient address received on the input side to a container message for the respective recipient address, and to forward the respective container message when the maximal dwell duration of one of the message units assigned to it has expired or a predefined maximal data volume is assigned to the respective container message, induced by the message units assigned to it.

10 Claims, 2 Drawing Sheets

(56) References Cited

U.S. PATENT DOCUMENTS

| | | | | |
|---|---|---|---|---|
| 2003/0147420 | A1* | 8/2003 | Beckwith | H04W 84/18 370/466 |
| 2005/0002417 | A1* | 1/2005 | Kelly | H04L 69/08 370/466 |
| 2005/0254518 | A1* | 11/2005 | Fujimori | H04L 69/08 370/466 |
| 2009/0003600 | A1* | 1/2009 | Chen | H04N 7/1675 380/217 |
| 2009/0268744 | A1 | 10/2009 | Ihle et al. | |
| 2009/0292844 | A1 | 11/2009 | Ihle et al. | |
| 2013/0044759 | A1* | 2/2013 | Reed | H04L 69/167 370/401 |

FOREIGN PATENT DOCUMENTS

| | | |
|---|---|---|
| DE | 10 2006 055 514 A1 | 11/2007 |
| DE | 10 2007 043 707 A1 | 3/2009 |
| DE | 10 2010 023 071 A1 | 4/2011 |

OTHER PUBLICATIONS

German Search Report dated Jul. 23, 2012, including English translation (ten (10) pages).

International Search Report dated Mar. 5, 2014 with English translation (five (5) pages).

* cited by examiner

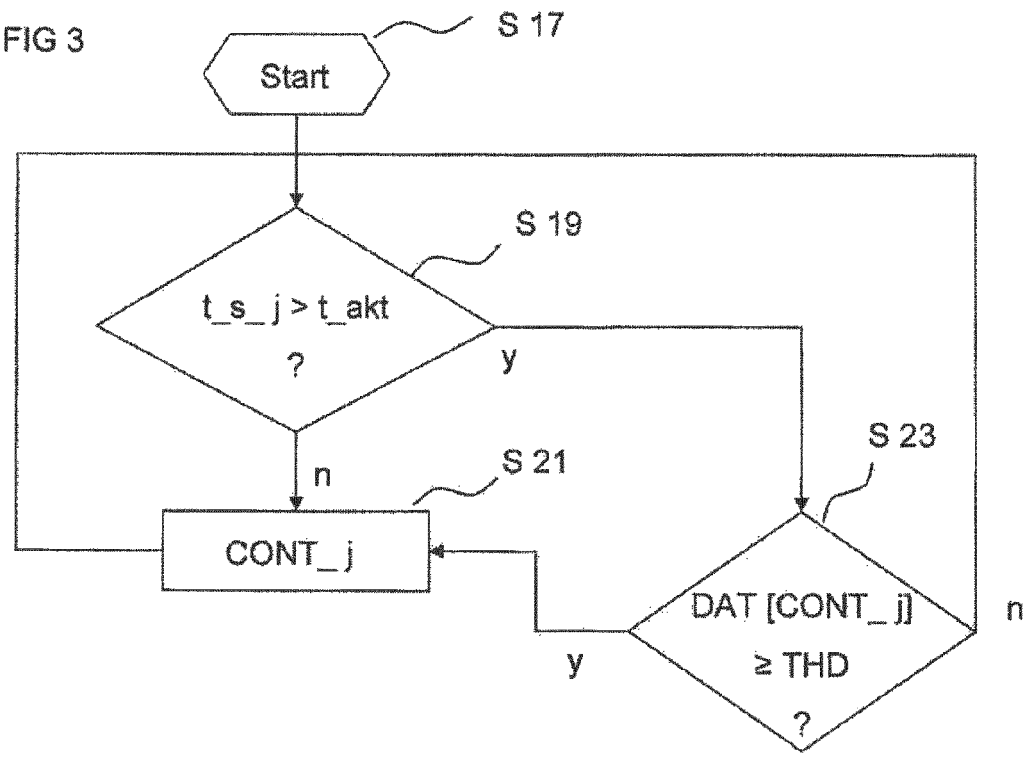
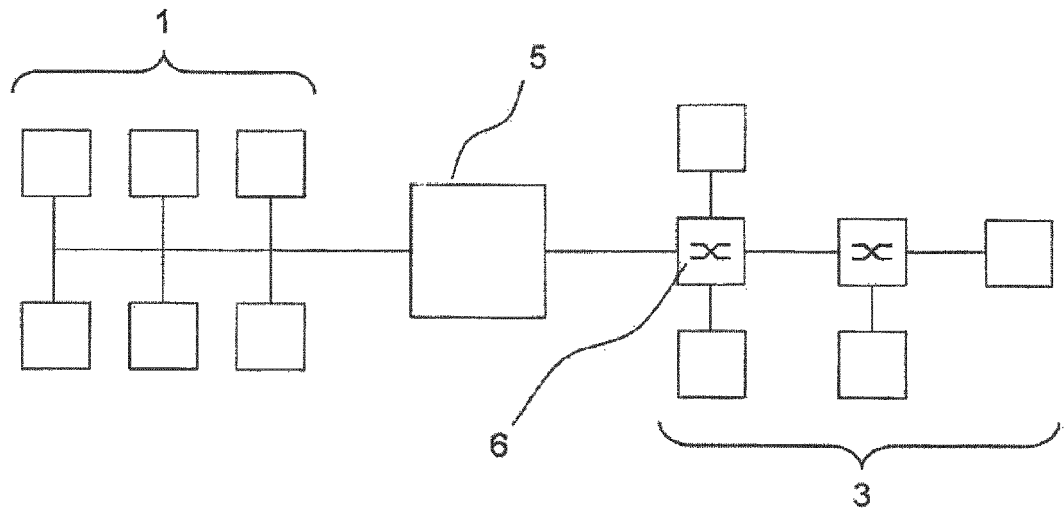

CONVERSION DEVICE AND COMMUNICATION NETWORK HAVING A CONVERSION DEVICE

CROSS REFERENCE TO RELATED APPLICATIONS

This application is a continuation of PCT International Application No. PCT/EP2012/075899, filed Dec. 18, 2012, which claims priority under 35 U.S.C. §119 from German Patent Application No. 10 2011 089 420.9, filed Dec. 21, 2011, the entire disclosures of which are herein expressly incorporated by reference.

BACKGROUND AND SUMMARY OF THE INVENTION

The invention relates to a conversion device and a communications network having the conversion device. Modern motor vehicles have a plurality of regulating and control devices, and a plurality of sensors which, for example, may also include a video camera or several video cameras. Modern motor vehicles may also have devices for the purpose of information transmission or entertainment of vehicle occupants, such as a radio and/or a video playback device. Furthermore, navigation devices are also regularly used in modern motor vehicles. An efficient operation of these devices requires a suitable communications network.

Up to now, different bus systems have frequently been used in motor vehicles, such as the Local Interconnect Network (LIN), the Controller Area Network (CAN), or the FlexRay.

With an increasing complexity of the regulating and control devices and with a growing number of the above-mentioned devices, the demand for networks, such as the need for Ethernet networks, is rising.

It is an object of the invention to provide a conversion device which contributes to an efficient and reliable data transfer. According to a further aspect, it is an object of the invention to create a communications network which contributes to an efficient and reliable data transfer.

According to a first aspect, the invention includes a conversion device which is designed for converting message units of a first communications protocol, which are received on the input side, to container messages of a second communications protocol. A specified maximal dwell duration in the conversion device is assigned to each message unit. The conversion device is designed for assigning message units with a same recipient address received on the input side to a container message for the respective recipient address and for forwarding the respective container message when the maximal dwell duration of at least one of the message units assigned to it has expired or a specified maximal data volume is assigned to the respective container message, induced by the message units assigned to it.

According to a second aspect, the conversion device is arranged in a communications network having a first subnetwork based on a first communications protocol, and a second subnetwork based on a second communications protocol. The conversion device is arranged at an interface between the first subnetwork and the second subnetwork. The communications network may also include further subnetworks, such as an additional subnetwork which is based on the first communications protocol.

The conversion device may, for example, also include a gateway or be a gateway, which may also be called a converting gateway.

The conversion device is distinguished by the fact that, during its operation, depending on the arrival time and the respective maximal dwell duration, as required, several and frequently even a plurality of message units can be assigned to a single container message, and therefore their available data volume, on the one hand, can be utilized as well as possible and thus the number of container messages which, in each case, are to be sent to the respective recipient address can be minimized, and, on the other hand, it can be ensured that the respective maximal dwell time in the conversion device is not exceeded for each message unit.

In this manner, a timely transmission of the respective message units on the output side of the conversion device can be guaranteed. Furthermore, however, the number of the container messages to be sent to the respective recipient address can be minimized which, particularly in the case of units which receive the respective container message, keeps their loading as low as possible. In this case, for example, the receiving of a respective container message is connected with an interrupt treatment. By providing a respective container message for the respective recipient address, a unicast as well as a multicast therefore becomes possible for each addressed recipient or for each addressed recipient group.

The maximal data volume can be appropriately predefined and thereby ensure that all of the message units assigned to the container message can, in fact, be accommodated in the latter.

Furthermore, the conversion device contributes to the fact that particularly time-critical message units with a correspondingly briefly predefined maximal dwell duration are forwarded correspondingly promptly in a respective container message. In this connection, other message units assigned to the respective container message then correspondingly also benefit from a quick forwarding of the container message.

In addition, by minimizing the number of the respective sent container messages, a network load of the second subnetwork based on the second communications protocol can be kept as low as possible, which contributes to the fact that correspondingly time-critical message units in respective container messages can be sent particularly reliably and also rapidly by way of the second communications network.

Correspondingly, a contribution can also be made to keeping the loading of the respective receiving unit of the container message as low as possible. Furthermore, a contribution can be made to transporting particularly real-time-critical message units especially in the second subnetwork.

According to an advantageous further development, in the case of at least a partial quantity of message units, an identification is assigned to each of the respective message units, and the conversion device is designed for making the assigned maximal dwell time available as a function of the respective identification of the messaging unit. In this fashion, the respective assigned maximal dwell time can easily be made available; thus, as required, by way of a corresponding data bank which, if necessary, may also be designed outside the conversion device and to which, as required, several conversion devices can also have access. In this case, the respective identification may, for example, be a so-called message ID.

According to a further advantageous development, in the case of at least a partial quantity of the message units, the respective message units each include information regarding the assigned maximal dwell duration. In this case, the conversion device is designed to extract the maximal dwell duration assigned to the respective message unit from the latter. In this manner, the respective maximal dwell duration can easily be determined, specifically directly while using the respective message unit.

According to further advantageous developments, the first communications protocol is CAN-bus-based, FlexRay-based, and/or LIN-bus-based. According to a further advantageous development, the second communications protocol is Ethernet-based. In principle, for example, the first communications protocol may be Ethernet-based and the second communications protocol may be CAN-bus-based, FlexRay-based, or LIN-bus-based.

Advantageously, the conversion device and/or the communications network is arranged in a vehicle. They may, for example, also be arranged in an airplane or in a production system.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a view of a communications network with a conversion device;
FIG. 3 is a flow chart of a second program run in the conversion device.

DETAILED DESCRIPTION OF THE DRAWINGS

Figure 2:
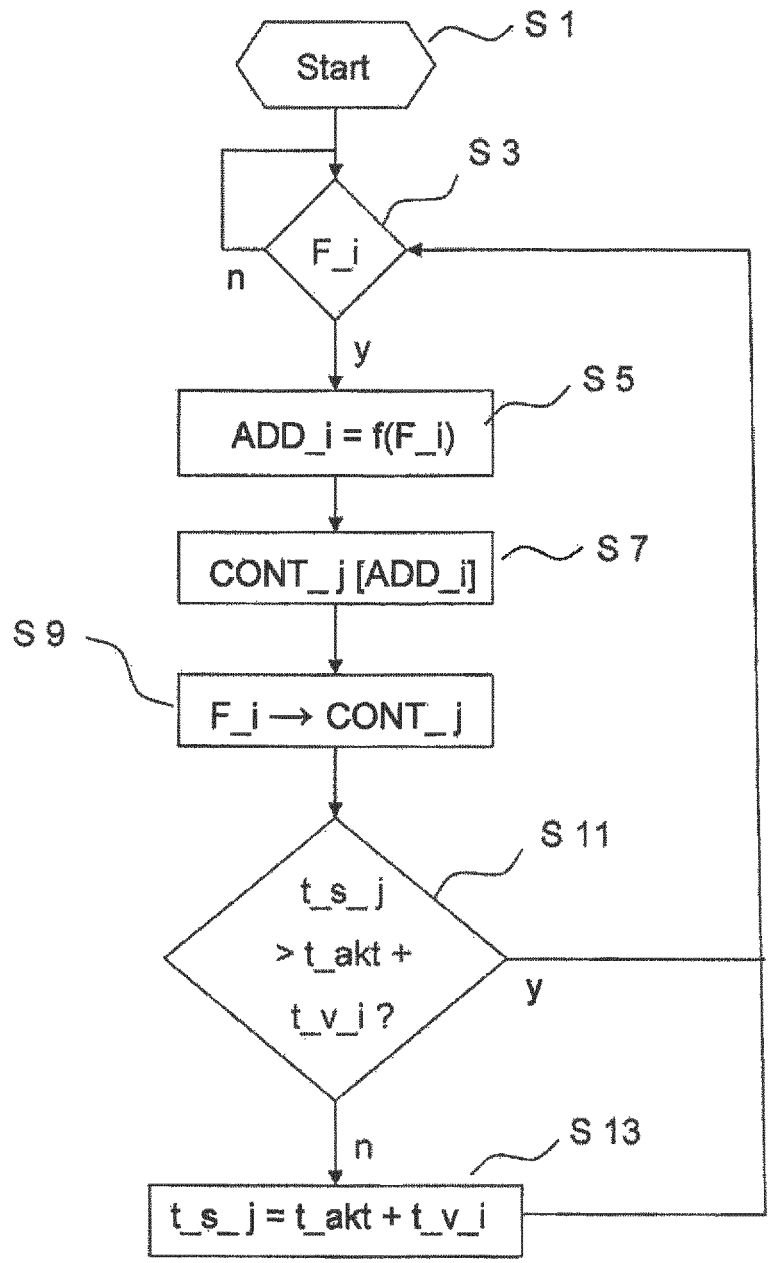
FIG. 2 is a flow chart of a first program run in the conversion device.

As shown in FIG. 1, the communications network includes a first subnetwork 1 and a second subnetwork 3. The first subnetwork 1 may, for example, be CAN-bus-based, FlexRay-based, or LIN-bus-based. Communications protocols of this type are widely used, particularly in the field of automotive engineering.

The second subnetwork 3 has a second communications protocol which, for example, is Ethernet-based. In any case, the communications protocol of the second subnetwork is distinguished in that, in particular, it has a larger data volume per message than the data volume in the case of the first communications protocol. In this context, the messages according to the first communications protocol are called message units $F\_i$ and the messages of the second communications protocol are called container messages CONT _j. i and j represent corresponding counters.

As required, the second subnetwork 3 has one or more connection elements 6, particularly so-called transparent connection elements which may be designed, for example, as a switch, particularly when the second subnetwork is Ethernet-based.

A conversion device 5 is arranged at an interface between the first and the second subnetwork 1, 3. The conversion device 5 may include a gateway or be a gateway. The conversion device 5 is designed for converting message units $F\_i$ of the first communications protocol, which are received by the conversion device 5 on the input side, into container messages CONT_j of the second communications protocol. A predefined maximal dwell duration $t\_v\_i$ in the conversion device 5 is assigned to each message unit $F\_i$. The conversion device 5 is designed for assigning message units $F\_i$ with an identical recipient address ADD_i received on the input side to a container message CONT_j for the respective recipient address ADD_i, and to forward the respective container message CONT_j when the maximal dwell duration $t\_v\_i$ of one of the message units $F\_i$ assigned to it has expired or a predefined maximal data volume THD is assigned to the respective container message CONT_j, as a result of the message units $F\_i$ assigned to it.

The conversion device 5 has at least one communications interface respectively to the first subnetwork 1 and a further communications interface to the second subnetwork 3. Furthermore, it preferably has an arithmetic unit and a data and program memory. One or more programs are stored in the data and program memory, which run in this conversion device 5 during its operation and, in particular, are processed in the arithmetic unit.

As shown in FIG. 2, a first program is started in Step S1, in which variables are initialized, as required. In Step S3, it is checked whether a respective message unit $F\_i$ of the first communications protocol was received by it on the input side. If this is not so, the processing returns to Step S3, as required, after a predefined waiting period.

However, if the condition of Step S3 has been met, it is determined in Step S5 which recipient address ADD_i is assigned to the respective message unit $F\_i$.

Subsequently, it is checked in Step S7 whether a respective container message CONT_j for the respective recipient address ADD_i of the conversion device is already prepared and is therefore waiting to be sent. If a corresponding container message CONT_j has not yet been prepared, it is correspondingly provided in the conversion device 5.

In Step S9, the message unit $F\_i$ is assigned to the respective container unit CONT_j with the same recipient address ADD_i.

Subsequently, it is checked in Step 11 whether a sending point in time $t\_s\_j$ assigned to the respective container message CONT_j is greater than the sum of an actual point in time $t\_akt$ and the respective maximal dwell time $t\_v\_i$ of the just assigned message unit $F\_i$. If this is so, the processing is continued again, as required, after a predefined waiting time, in Step 3.

If, in contrast, the condition of Step S11 has not been met, in Step S13, the respective sending point in time $t\_s\_j$ of the container message CONT_j will be newly determined, specifically from the sum of the actual point in time $t\_akt$ and the maximal dwell time $t\_v\_i$ of the just assigned message unit $F\_i$. Subsequently, the processing, as required, is continued again after the predefined waiting period—in Step S3.

As shown in FIG. 3, a second program, which is run during the operation of the conversion device 5 in this conversion device 5, is started in Step S17, in which, as required, variables are initialized.

In a subsequent step S19, it is checked for the respective present container messages CONT_j whether the respective assigned provided sending point in time $t\_s\_j$ is greater than the actual point in time $t\_akt$. If this is not so, the respective container message CONT_j is forwarded in Step S21 by the conversion device, specifically to the second subnetwork 3. Following the processing of Step S21, the processing is continued again in Step 19, as required, after a predefined waiting period.

In contrast, when the condition of Step S19 has been met, it is checked in Step S23 whether a respective data volume DAT assigned to the respective container message CONT_j is greater than or equal to a maximal data volume THD. The maximal data volume THD is appropriately predefined.

When the condition of Step S23 has been met, the processing will be continued in Step S21 and thereby the sending-out of the respective container message CONT_j will be continued.

In contrast, when the condition of Step S23 has not been met, the processing, as required, after the predefined waiting period, will be continued in Step S19.

The respective maximal dwell duration $t\_v\_i$ may, for example, be determined by extracting respective information representative of the maximal dwell duration $t\_v\_i$, which is contained in the respective message unit $F\_i$. As an alternative or in addition, as a function of an identification assigned to the respective message unit $F\_i$, the assigned maximal dwell duration $t\_v\_i$ can be made available to the conversion device 5. This can, for example, take place by means of a suitable data bank, initiated by a corresponding query. The data bank may be constructed within the conversion device, but may also be constructed outside the latter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

Communications Network
1 First subnetwork
3 Second subnetwork
5 Conversion device
S1-Sx Step
F_i Message unit (frame)
ADD_i Recipient address
CONT_j Container message
t_s_j Sending point in time container message
t_akt Actual point in time
t_v_i Maximal dwell duration
DAT Data volume
THD Maximal data volume

What is claimed is:

1. A conversion device comprising:
a first communications interface that is configured to communicate with a first subnetwork that is based on a first communications protocol;
a second communications interface that is configured to communicate with a second subnetwork that is based on a second communications protocol; and
a processor that is configured to:
convert message units of the first communications protocol, which are received by the first communications interface, to container messages of the second communications protocol,
assign a predefined maximal dwell duration to each of the message units,
assign message units with a same recipient address to a respective container message for the respective recipient address, and
forward the respective container message when the maximal dwell duration of at least one of the message units assigned to the respective container message has expired, or a predefined maximal data volume is assigned to the respective container message, wherein the predefined maximal data volume is induced by the message units assigned to the respective container message.

2. The conversion device according to claim 1, wherein, in a case of at least a partial quantity of the message units:
a respective identification is assigned to each of the respective message units, and
the processor is configured to make the assigned maximal dwell time available as a function of the respective identification of the respective messaging unit.

3. The conversion device according to claim 1, wherein, in a case of at least a partial quantity of the message units:
the respective message units each comprise information regarding the assigned maximal dwell duration, and
the processor is configured to extract the maximal dwell duration assigned to the respective message unit from the respective message unit.

4. The conversion device according to claim 1, wherein the first communications protocol is CAN-bus-based.

5. The conversion device according to claim 1, wherein the first communications protocol is FlexRay-based.

6. The conversion device according to claim 1, wherein the first communications protocol is LIN-bus-based.

7. The conversion device according to claim 1, wherein the second communications protocol is Ethernet-based.

8. The conversion device according to claim 1, wherein the conversion device is arranged in a vehicle.

9. A communications network comprising:
a first subnetwork that is based on a first communications protocol;
a second subnetwork that is based on a second communications protocol; and
a conversion device arranged at an interface between the first subnetwork and the second subnetwork, the conversion device comprising:
a first communications interface that is configured to communicate with the first subnetwork;
a second communications interface that is configured to communicate with the second subnetwork; and
a processor that is configured to:
convert message units of the first communications protocol, which are received by the first communications interface, to container messages of the second communications protocol,
assign a predefined maximal dwell duration to each of the message units,
assign message units with a same recipient address to a respective container message for the respective recipient address, and
forward the respective container message when the maximal dwell duration of at least one of the message units assigned to the respective container message has expired, or a predefined maximal data volume is assigned to the respective container message, wherein the predefined maximal data volume is induced by the message units assigned to the respective container message.

10. The communications network according to claim 9, wherein the communications network is arranged in a vehicle.

* * * * *